(12) United States Patent
Becerra

(10) Patent No.: US 8,344,527 B2
(45) Date of Patent: Jan. 1, 2013

(54) APPARATUS FOR CONVERTING MOMENTUM INTO USEFUL WORK

(75) Inventor: Ruben Becerra, San Marcos, TX (US)

(73) Assignee: Phoenix Renewable Energy, Inc., San Marcos, TX (US)

( * ) Notice: Subject to any disclaimer, the term of this patent is extended or adjusted under 35 U.S.C. 154(b) by 403 days.

(21) Appl. No.: 12/779,889

(22) Filed: May 13, 2010

(65) Prior Publication Data

US 2010/0288074 A1 Nov. 18, 2010

Related U.S. Application Data

(60) Provisional application No. 61/177,819, filed on May 13, 2009.

(51) Int. Cl.
*F03G 7/00* (2006.01)
(52) U.S. Cl. .................................................... 290/1 R
(58) Field of Classification Search ............... 290/1 R
See application file for complete search history.

(56) References Cited

U.S. PATENT DOCUMENTS

| | | | |
|---|---|---|---|
| 1,916,873 A * | 7/1933 | Wiggins | 185/39 |
| 2,346,643 A | 4/1944 | Barnett | |
| 3,944,855 A | 3/1976 | Le Van | |
| 4,238,687 A * | 12/1980 | Martinez | 290/1 R |
| 4,239,975 A | 12/1980 | Chiappetti | |
| 4,250,395 A | 2/1981 | Lundgren | |
| 4,418,542 A | 12/1983 | Ferrell | |
| 4,434,374 A * | 2/1984 | Lundgren | 290/1 R |
| 4,437,015 A | 3/1984 | Rosenblum | |
| 4,614,875 A | 9/1986 | McGee | |
| 4,739,179 A | 4/1988 | Stites | |
| 4,980,572 A | 12/1990 | Sen | |
| 5,157,922 A | 10/1992 | Baruch | |
| 5,355,674 A | 10/1994 | Rosenberg | |
| 6,204,568 B1 | 3/2001 | Runner | |
| 6,353,270 B1 | 3/2002 | Sen | |
| 6,362,534 B1 | 3/2002 | Kaufman | |
| 6,494,144 B1 | 12/2002 | Perez Sanchez | |
| 6,767,161 B1 | 7/2004 | Calvo et al. | |
| 6,858,952 B2 * | 2/2005 | Gott et al. | 290/1 R |
| 6,949,840 B2 | 9/2005 | Ricketts | |
| 7,067,932 B1 | 6/2006 | Ghassemi | |
| 7,489,045 B1 | 2/2009 | Bradford et al. | |
| 8,123,431 B2 * | 2/2012 | Chen | 404/71 |

(Continued)

FOREIGN PATENT DOCUMENTS

| | | | |
|---|---|---|---|
| DE | 4034219 | | 4/1992 |
| FR | 2516319 A | * | 5/1983 |
| GB | 2254111 A | * | 9/1992 |

(Continued)

*Primary Examiner* — Joseph Waks
(74) *Attorney, Agent, or Firm* — Hulsey, P.C.; William N. Hulsey, III; Loren T. Smith

(57) ABSTRACT

An efficient apparatus for converting momentum into useful work is provided. The apparatus is disposed within a roadway such that when a passing automobile drives over the device, the top of the device is moved downward on a hinge causing a pulley attached to a clutch to rotate a shaft. The clutch ensures that on the "up-stroke" the shaft is not rotated in the opposite direction. Through a series of pulleys, an optimum gear ratio is achieved finally connecting to a generator to output electricity. The top of the device is returned to be even with the roadway by a spring loaded wheel assembly. The apparatus is designed to accommodate loads up to 18,000 lbs and be capable of being deployed across a multi-lane roadway.

20 Claims, 12 Drawing Sheets

U.S. PATENT DOCUMENTS

| | | | |
|---|---|---|---|
| 8,164,204 B2 * | 4/2012 | Jang | 290/1 R |
| 2003/0034652 A1 | 2/2003 | Slatkin | |
| 2005/0193728 A1 | 9/2005 | Newman | |
| 2005/0200132 A1 | 9/2005 | Kenney | |
| 2006/0152008 A1 * | 7/2006 | Ghassemi | 290/1 R |

FOREIGN PATENT DOCUMENTS

| | | | |
|---|---|---|---|
| GB | 2435495 A | * | 8/2007 |
| KR | 2004018057 A | * | 3/2004 |
| WO | WO 8607504 A | * | 12/1986 |

* cited by examiner (Prior Art)

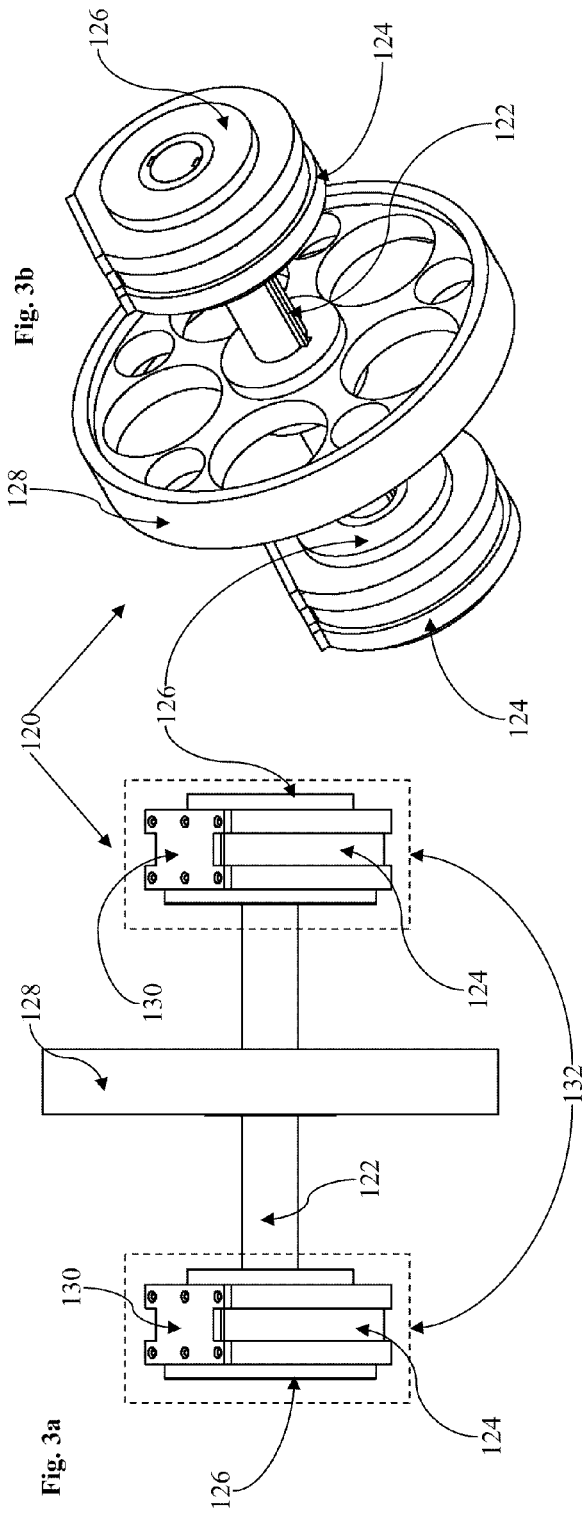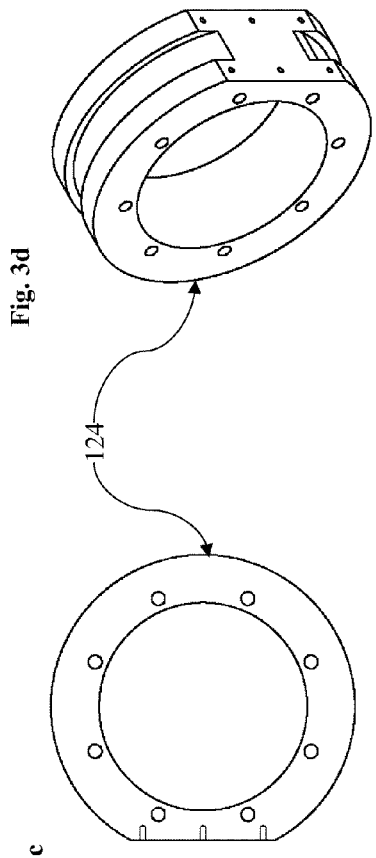

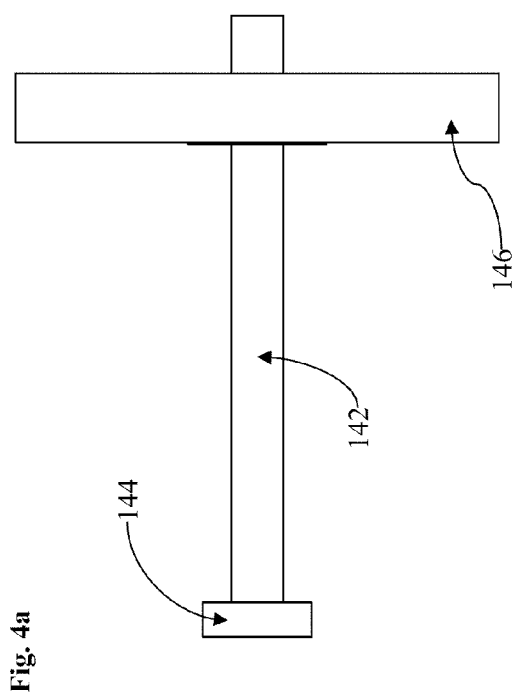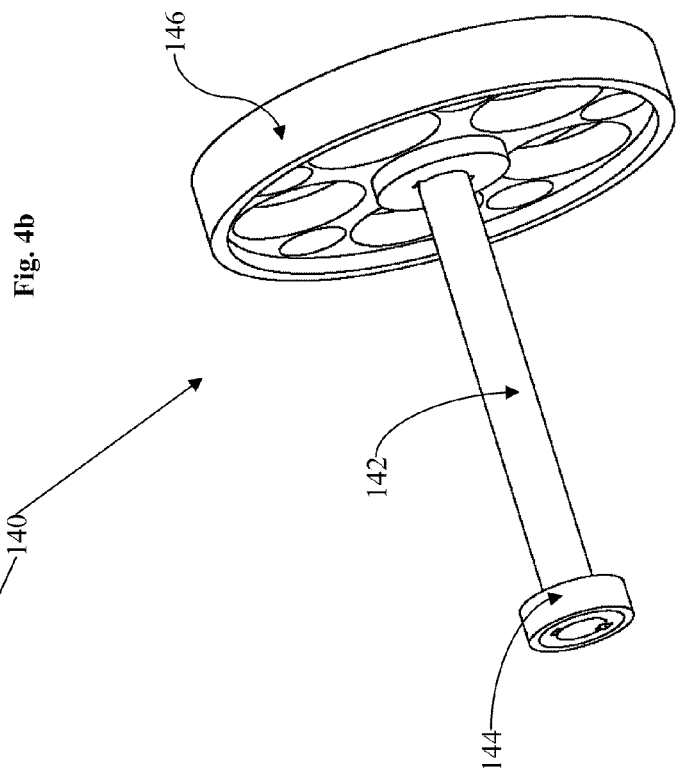

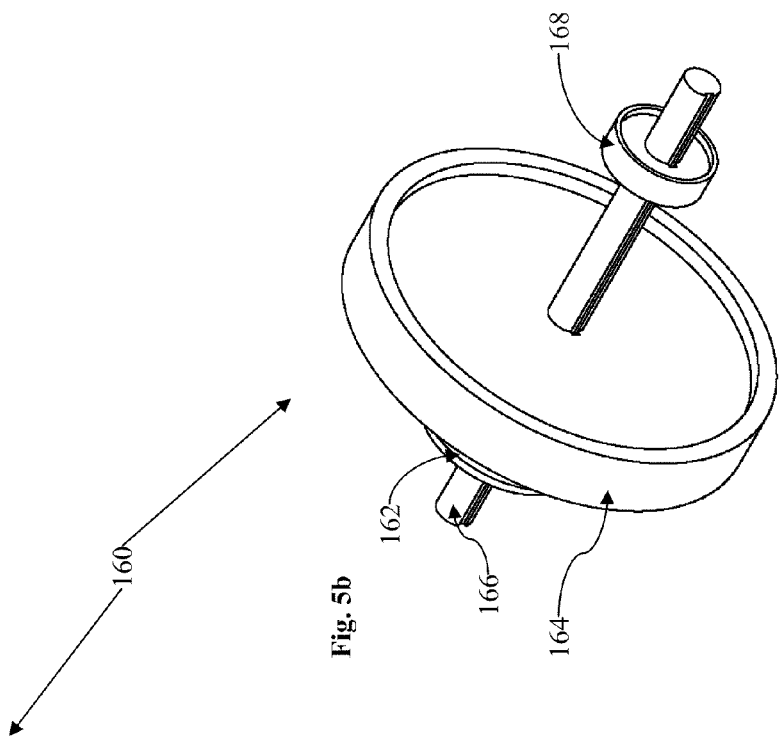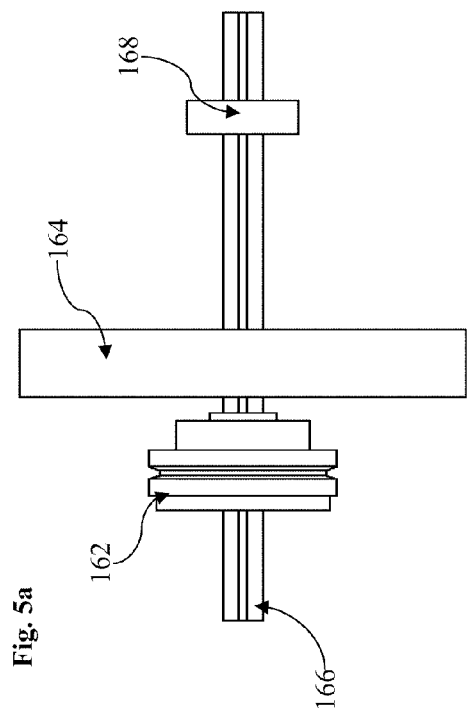

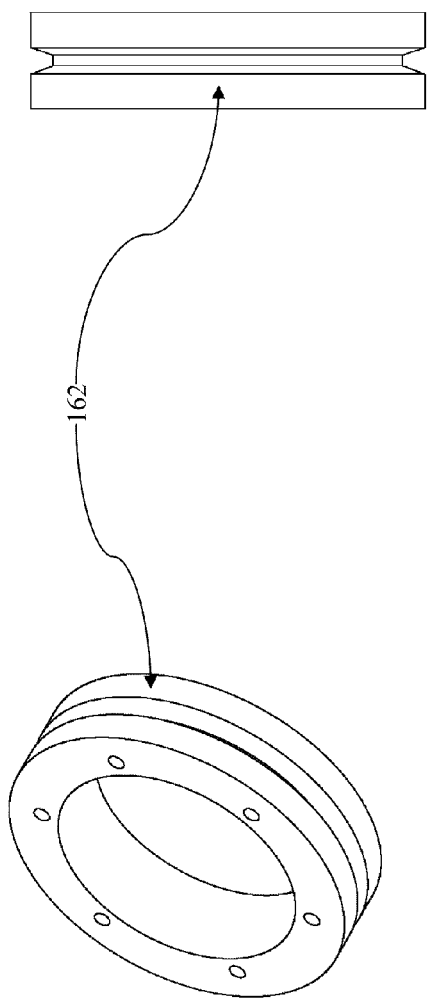
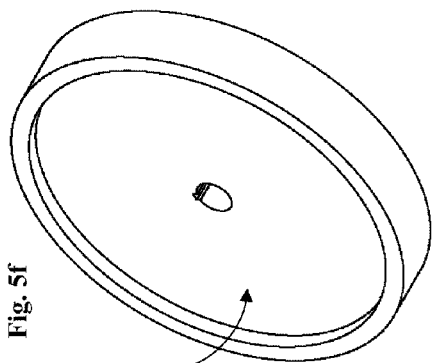
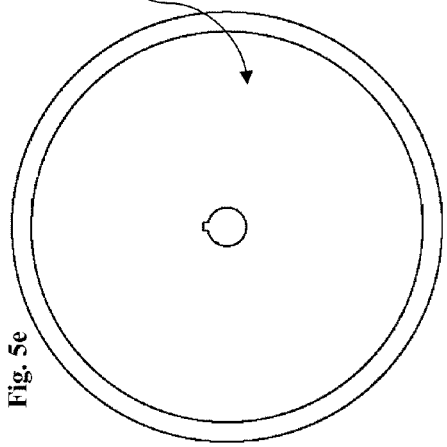
Fig. 5c  Fig. 5d  Fig. 5e  Fig. 5f

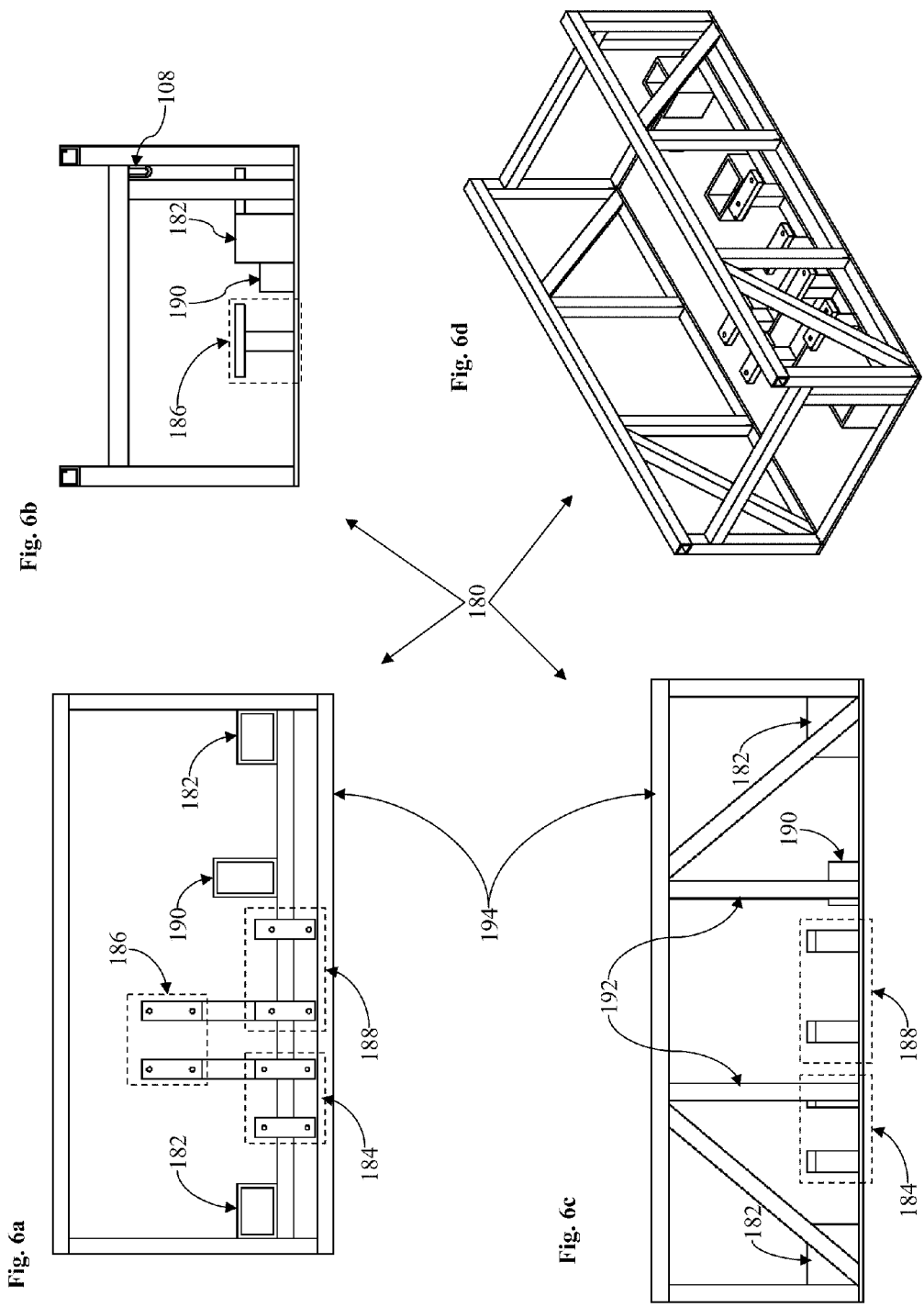

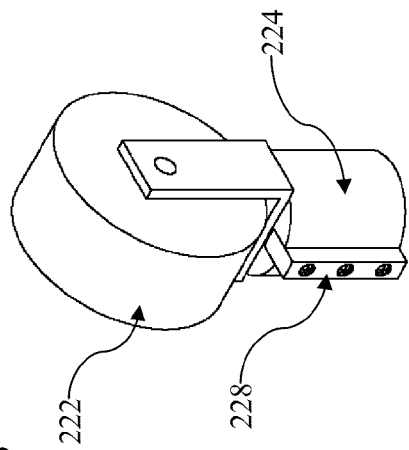
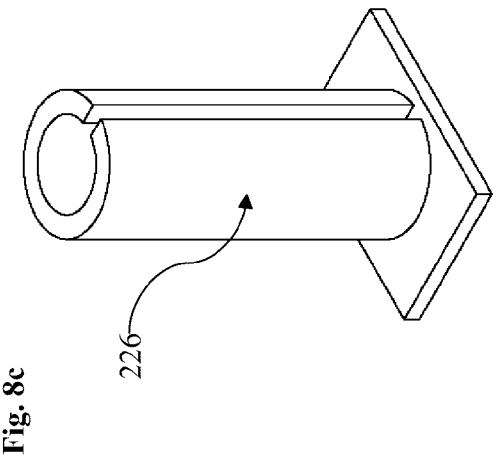
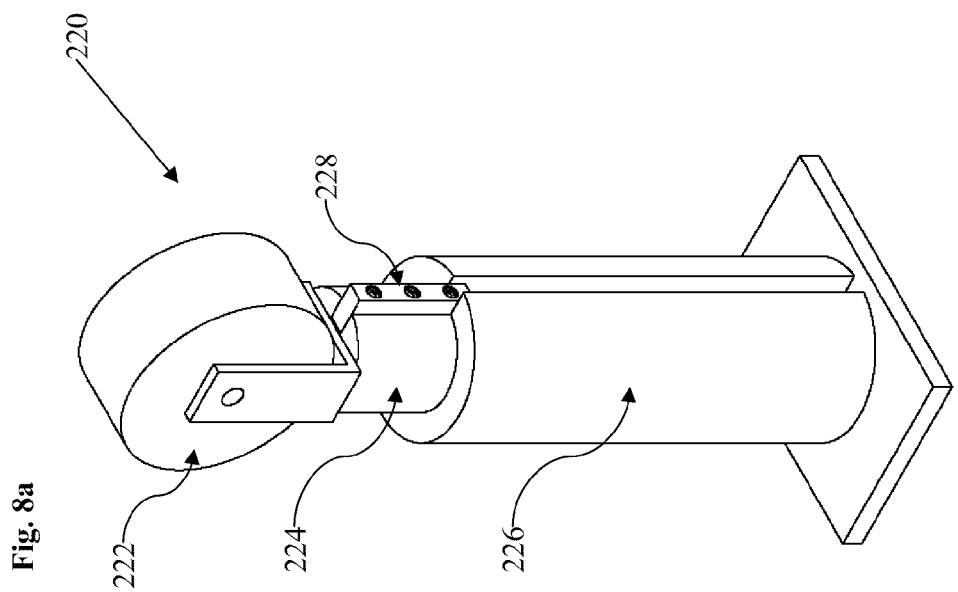

APPARATUS FOR CONVERTING MOMENTUM INTO USEFUL WORK

CROSS REFERENCE TO RELATED APPLICATION

This application claims the priority of previously filed U.S. Provisional Application No. 61/177,819, filed on May 13, 2009, and entitled "APPARATUS FOR CONVERTING MOMENTUM INTO USEFUL WORK" said Provisional Application being incorporated herein for all purposes as if fully set forth.

FIELD OF THE INVENTION

The invention relates to a device placed within a roadway bed to convert momentum from passing automobiles into usable energy.

BACKGROUND OF THE INVENTION

It has long since been a goal to harvest energy from the motion of vehicles. One such solution appears in FIG. 1. This solution utilizes a hinged stepping board 5 attached to a rod 6 with a rubber head 9 which impacts a wheel 3 which causes the wheel 3 to rotate a shaft 12 directly connected to an alternator (not shown). As something with sufficient mass to overcome spring 10 presses down on hinged stepping board 5, rod 6 is forced down towards wheel 3. When the rubber head 9 impacts the wheel 3, the wheel 3 begins to rotate. To maintain contact between rubber head 9 and the wheel 3 for a longer period of time, and to allow rod 6 to have a greater available travel distance, the rubber head 9 is hinged 8 to rod 6. As the wheel 3 rotates, the shaft 12 rotates the alternator (not shown) generating electricity. Finally, when the mass is removed from the hinged stepping board 5, the spring 10 forces the hinged stepping board 5 back up to await the next mass.

This design has several deficiencies. First, the design has a one-to-one gear ratio between the wheel 3 and the alternator. Furthermore, when the hinged stepping board 5 is depressed, the wheel 3 will not even complete a full rotation. This means the alternator cannot deliver a useful amount of electricity.

Today, automobiles can weigh upwards of 18,000 lbs and busy roadways can have several hundred thousand automobiles per day. This design is not structurally sufficient to support the repeated cycles from day-to-day automobile traffic.

Furthermore, many of the components will require custom fabrication raising the cost and increasing time to market and time to replace broken parts.

In view of these shortcomings, and others not discussed but that will be apparent from this disclosure, there is a need for an optimized and cost effective device for creating a useful amount of electricity from passing automobiles which is specifically designed to accommodate repeated cycles from automobiles up to 18,000 lbs using predominantly "off-the-shelf" components.

BRIEF SUMMARY OF THE INVENTION

The disclosed subject matter provides an optimized cost effective device made from predominantly "off-the-shelf" components to create energy from passing automobiles by providing a structurally strong device placed within a roadway in a manner such that the device's top is substantially even with the roadway and when an automobile passes over the device, the weight of the automobile depresses the top of the device causing mechanical motion which is converted to usable energy.

It is an object of the disclosed subject matter to generate usable amounts of electricity from the routine motion of automobiles.

An object of the disclosed subject matter is to provide an "in the roadway" structure capable of supporting routine automobile traffic while reducing the weight of the structure.

An additional object of the disclosed subject matter is to optimize the speed ratio from the input to the output.

Another object of the disclosed subject matter is to minimize the number of custom fabricated components.

Yet another object of the disclosed subject matter is to be wide enough to span an entire lane of a roadway thereby ensuring all passing traffic impacts the device.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages that are included within this description, be within the scope of any claims filed later.

BRIEF DESCRIPTIONS OF THE DRAWINGS

The novel features believed characteristic of the disclosed subject matter will be set forth in any claims filed later. The disclosed subject matter itself, however, as well as a preferred mode of use, further objectives, and advantages thereof, will best be understood by reference to the following detailed description of illustrative embodiments when read in conjunction with the accompanying drawings, wherein:

FIG. 1 depicts an existing device to convert mechanical motion into usable energy (prior art).

FIGS. 2a, 2b, 2c, 2d, 2e, and 2f depict isometric top, side, isometric bottom, top, rear, and detailed rear views, respectively, of the plate assembly of one embodiment of the disclosed subject matter.

FIGS. 3a and 3b depict front and isometric views of the first shaft assembly of an embodiment of the disclosed subject matter.

FIGS. 3c and 3d depict side and isometric views, respectively, of the pulley.

FIGS. 4a and 4b depict side and isometric views, respectively, of the second shaft assembly of one embodiment of the disclosed subject matter.

FIGS. 5a and 5b depict side and isometric views, respectively, of the third shaft assembly of one embodiment of the disclosed subject matter.

FIGS. 5c and 5d depict isometric and front views, respectively, of the medium pulley of one embodiment of the disclosed subject matter.

FIGS. 5e and 5f depict side and isometric views, respectively, of the flywheel of one embodiment of the disclosed subject matter.

FIGS. 6a, 6b, 6c, and 6d depict top, side, front, and isometric views, respectively, of the frame of one embodiment of the disclosed subject matter.

Figure 1:
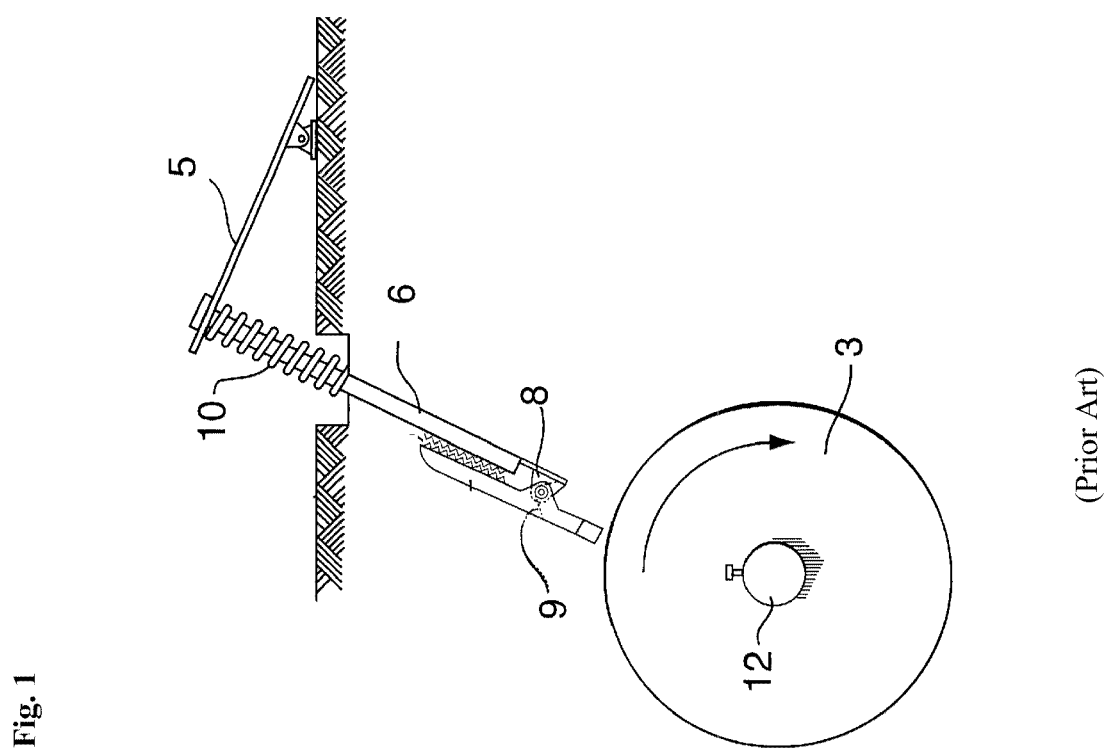
Figure 2B:
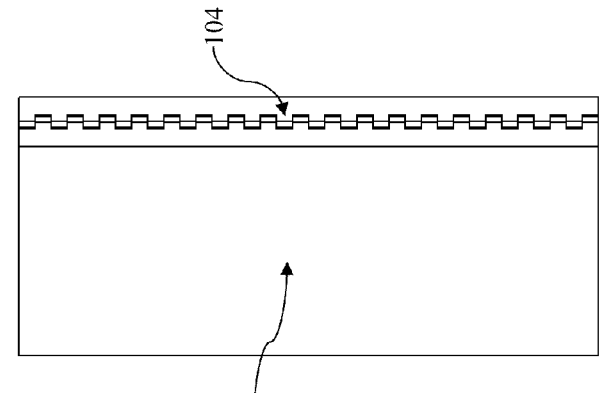
Figure 2D:
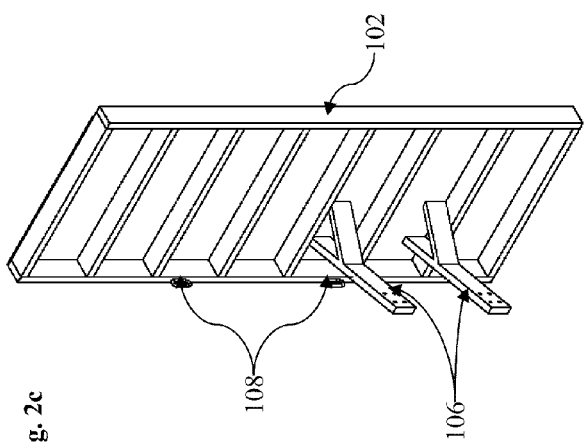
Figure 2A:
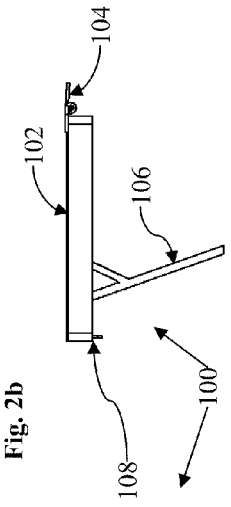
Figure 2C:
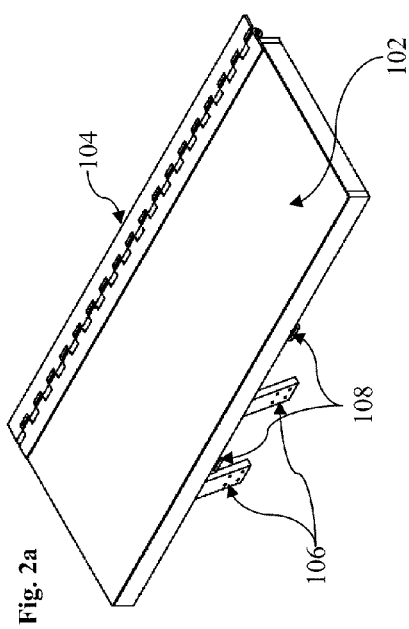
Figure 2E:
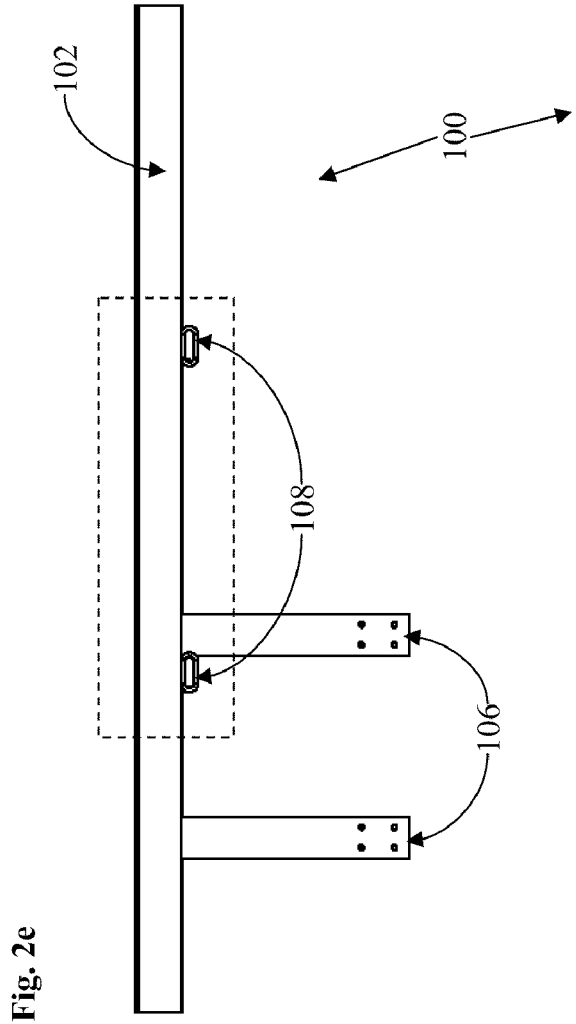
Figure 2F:
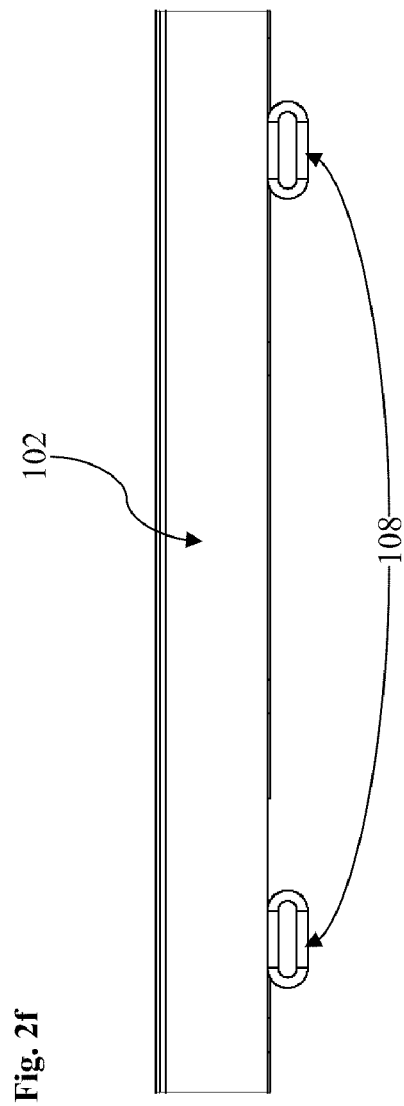
Figure 7A:
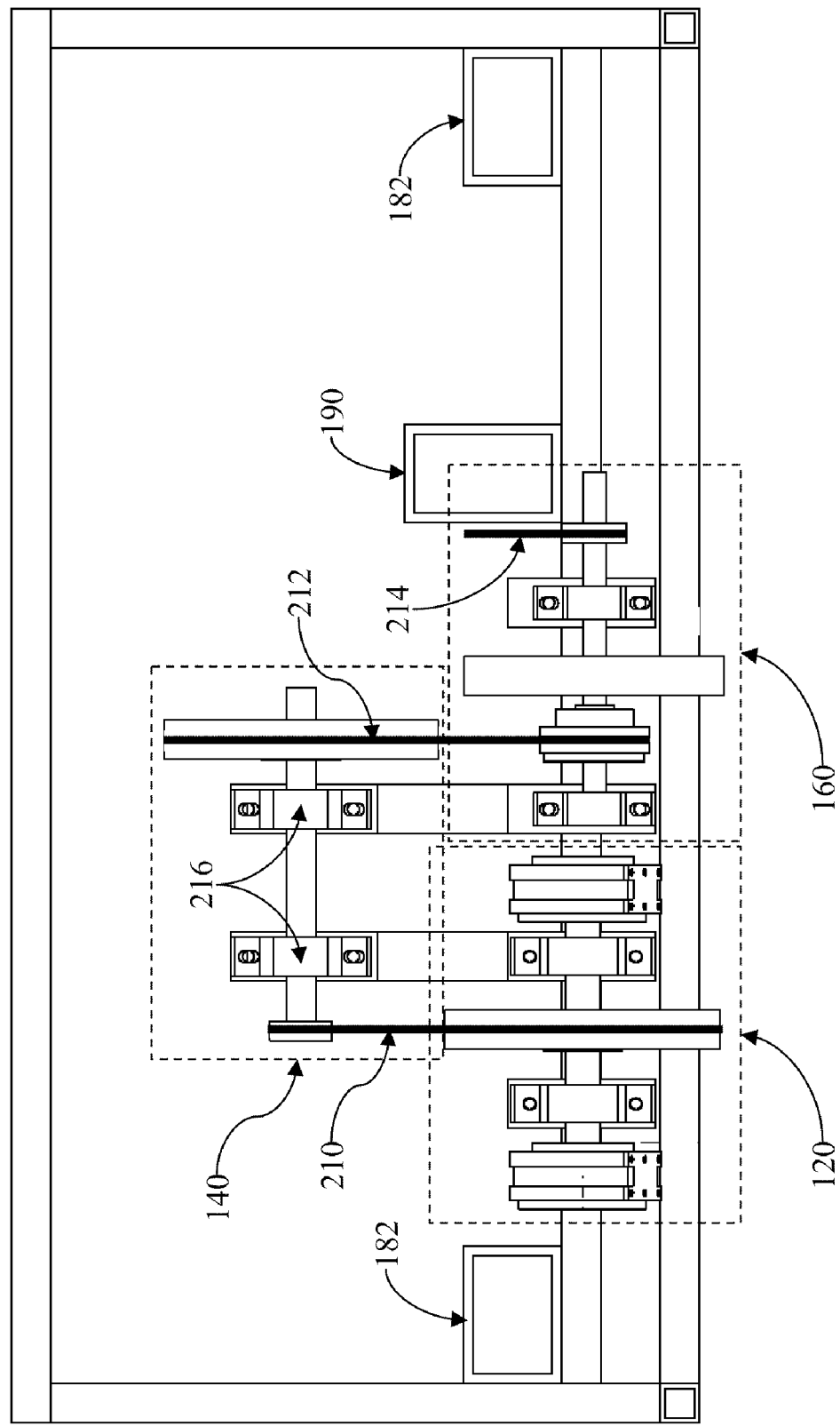
Figure 7B:
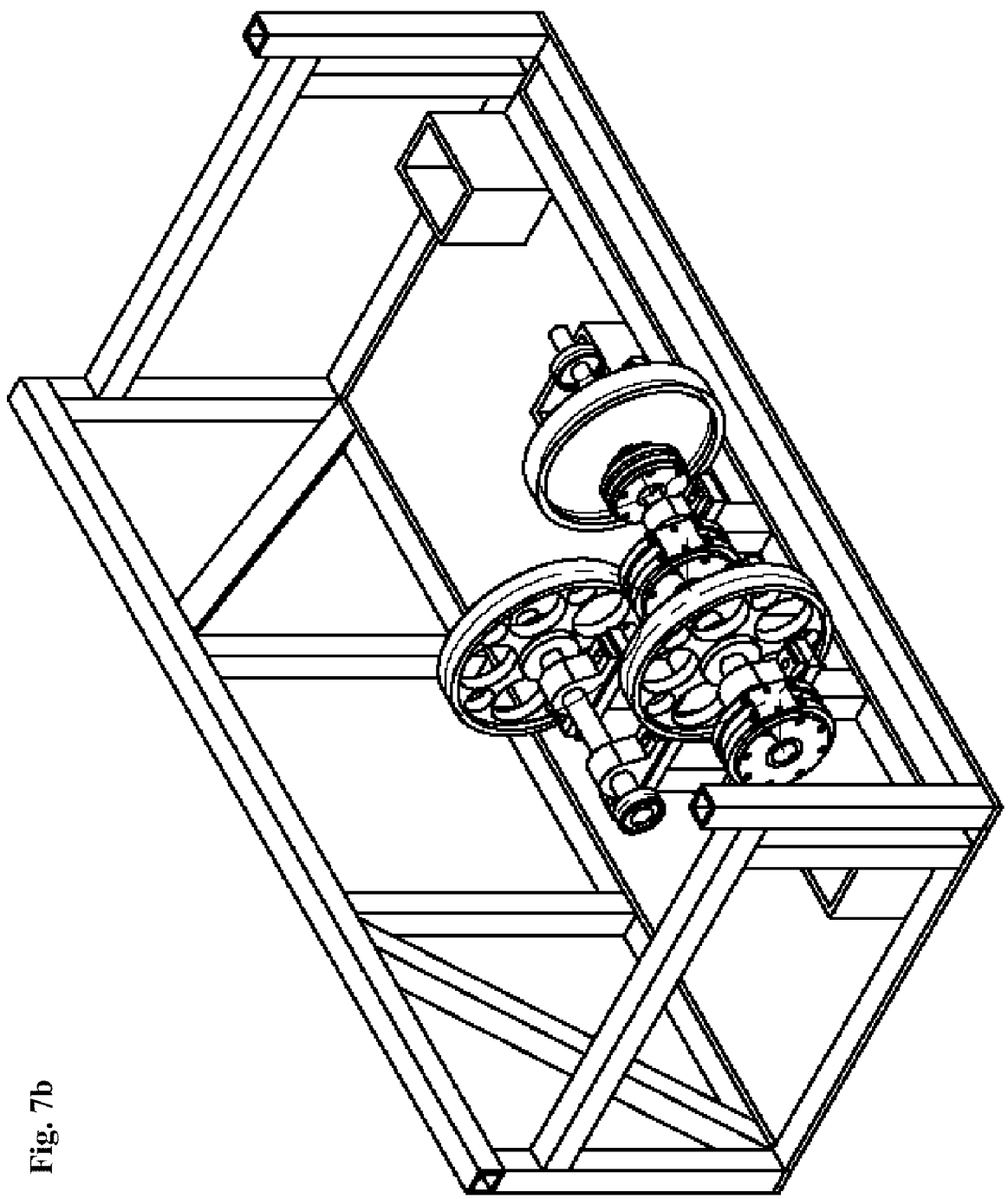

FIGS. 7a and 7b depict a top and isometric view, respectively, of the frame with each shaft assembly installed (note:

the front of the frame has been removed for clarity) of one embodiment of the disclosed subject matter.

FIGS. 8a, 8b, and 8c depict isometric views of the spring wheel assembly of one embodiment of the disclosed subject matter.

Figure 9:

FIG. 9 is a grayscale illustration of a complete embodiment of the disclosed subject matter (grayscale photograph).

DETAILED DESCRIPTION OF ILLUSTRATIVE EMBODIMENTS

Although described with particular reference to specific embodiments, those with skill in the arts will recognize that the disclosed embodiments have relevance to a wide variety of areas in addition to those specific examples described below.

All references, including publications, patent applications, and patents, cited herein are hereby incorporated by reference to the same extent as if each reference were individually and specifically indicated to be incorporated by reference and were set forth in its entirety herein.

FIGS. 2a, 2b, 2c, 2d, 2e, and 2f depict isometric top, side, isometric bottom, top, rear, and detailed rear views, respectively, of the plate assembly 100 of one embodiment of the disclosed subject matter. The plate assembly 100 is mounted flush with the roadway. The hinge 104 is oriented in the roadway so that oncoming traffic reaches the hinge 104 side of the plate assembly 100 first. Then the automobile would roll onto the plate 102. The weight of the automobile on the plate 102 causes the plate 102 to pivot at the hinge 104. Because the plate assembly is intended to accommodate the front wheels and then the rear wheels of each automobile, the plate 102 and hinge 104 must be designed to support the considerable weight of an automobile. Additionally, the hinge 104 must be able to survive repeated up and down motions.

To address the plate 102 challenges, in one embodiment, the plate 102 is 72"×30"×0.375" of AISI type 304 steel with reinforcing ribs (see FIG. 2c) underneath. This material and configuration is capable of supporting an 18,000 lbs load with a max deflection of 0.26". This configuration not only provides the strength and rigidity necessary, it also results in a cheaper and lighter solution. Also, because in this embodiment, the plate 102 is 72" across it can easily be deployed on multiple lane roadways and connected either in parallel or series as the job requirements dictated. In an alternate embodiment, the plate is wide enough to span one lane of a roadway. The single lane configuration maximizes plate impacts by ensuring all passing vehicles impact the plate 102. This also ensures that both front wheels and then both back wheels impact the plate 102 at approximately the same time thereby transferring a significantly larger amount of weight than a single tire impact.

In addition to the hinge 104 challenges listed above, the welding of the hinge 104 produces a heat affected zone which changes the material's properties (compare to annealed HR 1060 steel). After welding, the hinge has a yield strength of 77 Kpsi whereas 2000 psi is actually experienced. Furthermore, the endurance limit is 22.5 Kpsi whereas applied stress is 5,000 psi resulting in a safety factor of 4.5. Therefore, both the physical loads and the high cycle requirements are met.

Continuing with FIGS. 2a-2f, the transmission arms 106 are affixed to the bottom of the plate 102. It is important to note the "Y" configuration of each transmission arm 106. The "Y" shape provides increased strength and rigidity to each transmission arm 106. Finally, two retention rings 108 are coupled to the plate assembly 100 and will be discussed with reference to FIGS. 8a-8c.

FIGS. 3a and 3b depict front and isometric views of the first shaft assembly 120 of an embodiment of the disclosed subject matter. The first shaft assembly 120 (the input shaft assembly) has a large pulley 128 between two transmission assemblies 132 (pulley-clutch assemblies) coupled to a shaft 122 (input shaft). The shaft 122 is "keyed" so that any rotation of the transmission assemblies 132 causes the shaft 122 and pulley 128 to rotate. The transmission assemblies 132 contain a pulley 124 encompassing a clutch 126. The pulley 124 has a flat surface where an input belt (not shown) is compressed by a compression plate 130 which secures the input belt (not shown) against the pulley 124. The clutch 126 allows the pulley's 124 movement to only rotate the shaft 122 in one direction. In one embodiment, the clutch 126 is a Formsprag® (a registered trademark of Dana Corporation) Overrunning Clutch, AL-F2D2 series. Additionally, the input belt (not shown) must be able to withstand 1,500 lbs each (3,000 lbs per shaft). Therefore, in one embodiment, the belt strength chosen is 1,830 lbf/in width to provide a safety. FIGS. 3c and 3d show side and isometric views, respectively, of the pulley 124.

FIGS. 4a and 4b depict side and isometric views, respectively, of the second shaft assembly 140 (intermediate shaft assembly) of one embodiment of the disclosed subject matter. The second shaft assembly 140 has a shaft 142 (intermediate shaft) with a small pulley 144 (first intermediate shaft pulley) and large pulley 146 (second intermediate shaft pulley) on either ends.

FIGS. 5a and 5b depict side and isometric views, respectively, of the third shaft assembly 160 (output shaft assembly) of one embodiment of the disclosed subject matter. The third shaft assembly 160 has a shaft 166 with a pulley 162 (first output shaft pulley), a flywheel 164, and a smaller pulley 168 (second output shaft pulley) distributed across the shaft 166. FIGS. 5c and 5d depict isometric and front views, respectively, of the medium pulley 162 of one embodiment of the disclosed subject matter. FIGS. 5e and 5f depict side and isometric views, respectively, of the flywheel 164 of one embodiment of the disclosed subject matter.

In one embodiment, the first, second, and third shafts are made from AISI type 1045 steel, are fully keyed drive shafts, and are in one or more of the following diameters: 1 3/16", 1 1/2", and/or 1 3/4".

FIGS. 6a, 6b, 6c, and 6d depict top, side, front, and isometric views, respectively, of the frame 180 of one embodiment of the disclosed subject matter. The frame 180 contains two spring assembly mounts 182, a generator mount 190, a first shaft assembly mount 184, a second shaft assembly mount 186, and a third shaft assembly mount 188. The frame 180 must withstand many of the same structural requirements as the plate assembly 100 and in one embodiment is constructed of square tubing. In the pictured configuration, the front vertical support members 192 have a max deflection of 0.25" at 18,000 lbs and the front horizontal support member 194 has a max deflection of 0.0003" at 18,000 lbs. Additionally, in one embodiment a drain (not shown) is provided in the bottom of the frame to drain off any water that may fall within the device.

FIGS. 7a and 7b depict a top and isometric view, respectively, of the frame with each shaft assembly installed (note: the front of the frame 180 has been removed for clarity) of one embodiment of the disclosed subject matter. Referring now to FIG. 7a, belt 210 connects pulley 128 to pulley 144, belt 212 connects pulley 146 to pulley 162, and belt 214 connects pulley 168 to the generator (not shown). The sizes of the pulleys 128, 144, 146, 162, and 168 are chosen to reach a 1:100 speed ratio (gear ratio) from the plate 102 to the generator.

Each of the shaft assembly's shafts is threaded through two bearing mount assemblies 216 which are mounted to the frame 180. In one embodiment, the bearing mount assemblies 216 are general purpose, base mount, ball bearing style bearings. Although each shaft assembly has two bearing mount assemblies 216, only the second shaft's assemblies are numbered in the figures for clarity.

FIGS. 8*a*, 8*b*, and 8*c* depict isometric views of the spring wheel assembly 220 of one embodiment of the disclosed subject matter. The spring wheel assemblies 220 are coupled to the spring assembly mounts 182 and provide upward force to return the plate assembly 100 to be even with the road surface. The wheel 222 is pressed against the bottom of the plate assembly 100 by a spring (not shown) which is inside the spring holder 226. When the plate assembly 100 is pressed down by a passing automobile, the wheel 222 moves the spring slider 224 down compressing the spring (not shown). To prevent the wheel 222, and consequently the spring slider 224, from twisting in the spring holder 226, the spring holder 224 is keyed with a key insert 228 which aligns with a slot in the spring holder 226. In one embodiment, to accommodate the weight of the plate assembly 100 and return the plate assembly 100 to be even with the road surface in a relatively short time interval (about 0.1 seconds), the spring is chosen to have a k=70 lbs/in.

It is important to ensure the plate assembly 100 does not overshoot the road way surface either at rest or after an automobile has passed. To combat this, in one embodiment, a wire (not shown) or other tether is coupled between the retention rings 108 and the frame 180 and adjusted for the proper return travel length.

In one embodiment, the total depression distance of the plate assembly 100 is about 2" so as to maximize momentum and minimize impact on passing automobiles. Additionally, the optimum speed of passing automobiles is between 2 mph and 60 mph. This is because as the speed increases above 60 mph, the depression time is reduced.

It is important to note that in one embodiment, one or more of the pulleys could have trenches to accommodate belts and minimize the likelihood that a belt could "walk off" of the pulley while in motion. More specifically, one or more of the pulleys could accommodate a v-belt and/or be of either single groove solid or spoked construction.

Importantly, the disclosed subject matter has been designed to use many "off-the-shelf" components to lower cost. For example, in one embodiment the generator (not shown) is a GM® heavy duty truck alternator. In another embodiment, the only fabricated parts are the flywheel 164, the transmission assemblies 132, and the spring holder 216.

Finally, the electrical output of the generator (not shown) could be attached to a battery to store the electricity generated from the disclosed subject matter. The size of the battery would depend on the job requirements. For example, if the device was used to power intersection traffic lights, a relatively small battery would be required; however, if the device was used to power bridge heaters and/or emergency backups, a larger battery should be used.

FIG. 9 is a grayscale illustration of a complete embodiment of the disclosed subject matter (grayscale photograph). Note that in this embodiment, the downward motion of the plate 102 is stopped by the frame; however, the downward motion of the plate 102 could be stopped by other devices (e.g. the spring wheel assembly 220).

Although example diagrams and components to implement the elements of the disclosed subject matter have been provided, one skilled in the art, using this disclosure, could develop and/or use additional hardware to practice the disclosed subject matter and each is intended to be included herein.

In addition to the above described embodiments, those skilled in the art will appreciate that this disclosure has application in a variety of arts and situations and this disclosure is intended to include the same.

What is claimed is:

1. An optimized apparatus for converting momentum into useful work, the apparatus comprising:
   a plate assembly, said plate assembly comprising:
      a hinge pivotally coupled to one end of a plate;
      at least one retention device coupled to the opposite end of said plate, wherein said retention device impedes said plate's upward travel beyond substantially even to said hinge; and
      at least one transmission arm, said transmission arm coupled to the bottom of said plate;
   a frame, said frame comprising a plurality of mounts, wherein said plate assembly is coupled to a top of said frame such that said plate can pivotally rotate into said frame up to a predetermined distance;
   at least one upward force device coupled to one or more of said mounts, said upward force device delivering force sufficient to overcome the weight of said plate;
   an input shaft assembly coupled to at least one of said mounts, said input shaft assembly comprising:
      an input shaft;
      at least one pulley-clutch assembly coupled between said input shaft and said transmission arm, wherein said pulley-clutch assembly rotates said input shaft in only one direction in response to the movement of said transmission arm; and
      an input shaft pulley coupled to said input shaft;
   an output shaft assembly coupled to at least one of said mounts, said output shaft assembly comprising:
      an output shaft;
      a flywheel, said flywheel coupled to said output shaft;
      a first output shaft pulley, said first output shaft pulley coupled to said output shaft, wherein said first output shaft pulley is coupled to said input shaft pulley via at least one belt or an intervening shaft assembly and the gear ratio between said input shaft pulley and said first output shaft pulley causes said output shaft to rotate at a higher velocity than said input shaft; and
      a second output shaft pulley, said second output shaft pulley coupled to said output shaft;
   a generator coupled to at least one of said mounts, said generator coupled to said second output shaft pulley via at least one belt.

2. The apparatus of claim 1, additionally comprising at least one intervening shaft assembly, said intervening shaft assembly mechanically positioned between said input shaft assembly and said output shaft assembly.

3. The apparatus of claim 1, additionally comprising one intervening shaft assembly, said intervening shaft assembly comprising:
   an intermediate shaft;
   a first intermediate shaft pulley coupled to said intermediate shaft, said first intermediate shaft pulley also coupled to said input shaft pulley via at least one belt and the gear ratio between said input shaft pulley and said first intermediate shaft pulley causes said intermediate shaft to rotate at a higher velocity than said input shaft; and a second intermediate shaft pulley coupled to said intermediate shaft, said second intermediate shaft pulley also coupled to said first output shaft pulley via at least one belt and the gear ratio between said second intermediate shaft pulley and said first output shaft pulley causes said output shaft to rotate at a higher velocity than said intermediate shaft.

4. The apparatus of claim 3, wherein the apparatus can support at least 10,000 pounds on said plate.

5. The apparatus of claim 3, wherein said gear ratio is optimized for said generator.

6. The apparatus of claim 3, wherein said gear ratio from said input shaft pulley to said output shaft pulley is at least 1:50.

7. The apparatus of claim 3, wherein said gear ratio from said input shaft pulley to said output shaft pulley is at least 1:100.

8. The apparatus of claim 7, wherein the apparatus can support at least 18,000 pounds on said plate.

9. The apparatus of claim 1, the apparatus can support at least 10,000 pounds on said plate.

10. The apparatus of claim 1, wherein said gear ratio is optimized for said generator.

11. The apparatus of claim 1, wherein said gear ratio from said input shaft pulley to said output shaft pulley is at least 1:50.

12. The apparatus of claim 1, wherein said gear ratio from said input shaft pulley to said output shaft pulley is at least 1:100.

13. The apparatus of claim 1, wherein said predetermined distance is approximately two inches.

14. The apparatus of claim 1, wherein the apparatus is wide enough to span at least one lane of a roadway.

15. The apparatus of claim 14, the apparatus disposed within a roadway so said plate and said hinge are substantially even with the top of said roadway when at rest.

16. The apparatus of claim 14, wherein the apparatus has two upward force devices.

17. The apparatus of claim 1, wherein said upward force device comprises:
 a spring holder, wherein said spring holder is coupled to one or more of said mounts;
 a spring, said spring disposed within said spring holder; and
 a wheel, said wheel disposed on top of said spring such that said wheel is forced upward substantially in contact with the bottom of said plate.

18. The apparatus of claim 1, wherein said transmission arm is coupled to said pulley-clutch assembly via an input belt.

19. The apparatus of claim 18, said input belt is constructed to withstand at least 1500 lbf/in width.

20. An optimized apparatus for converting momentum into useful work, the apparatus comprising:
 a plate assembly, said plate assembly comprising:
  a hinge pivotally coupled to one end of a plate;
  at least one retention device coupled to the opposite end of said plate, wherein said retention device impedes said plate's upward travel beyond substantially even to said hinge; and
  at least one transmission arm, said transmission arm coupled to the bottom of said plate;
 a frame, said frame comprising a plurality of mounts, wherein said plate assembly is coupled to a top of said frame such that said plate can pivotally rotate into said frame up to a predetermined distance;
 at least one upward force device coupled to one or more of said mounts, said upward force device delivering force sufficient to overcome the weight of said plate, wherein said upward force device comprises:
  a spring holder, wherein said spring holder is coupled to one or more of said mounts;
  a spring, said spring disposed within said spring holder; and
  a wheel, said wheel disposed on top of said spring such that said wheel is forced upward substantially in contact with the bottom of said plate;
 an input shaft assembly coupled to at least one of said mounts, said input shaft assembly comprising:
  an input shaft;
  at least one pulley-clutch assembly coupled between said input shaft and said transmission arm, wherein said pulley-clutch assembly rotates said input shaft in only one direction in response to the movement of said transmission arm; and
  an input shaft pulley coupled to said input shaft;
 one intervening shaft assembly, said intervening shaft assembly comprising:
  an intermediate shaft;
  a first intermediate shaft pulley coupled to said intermediate shaft, said first intermediate shaft pulley also coupled to said input shaft pulley via at least one belt and the gear ratio between said input shaft pulley and said first intermediate shaft pulley causes said intermediate shaft to rotate at a higher velocity than said input shaft; and
  a second intermediate shaft pulley coupled to said intermediate shaft;
 an output shaft assembly coupled to at least one of said mounts, said output shaft assembly comprising:
  an output shaft;
  a flywheel, said flywheel coupled to said output shaft;
  a first output shaft pulley, said first output shaft pulley coupled to said output shaft, wherein said first output shaft pulley is also coupled to said second intermediate shaft pulley via at least one belt and the gear ratio between said second intermediate shaft pulley and said first output shaft pulley causes said output shaft to rotate at a higher velocity than said intermediate shaft; and
  a second output shaft pulley, said second output shaft pulley coupled to said output shaft;
 a generator coupled to at least one of said mounts, said generator coupled to said second output shaft pulley via at least one belt.

* * * * *